United States Patent [19]

Castaigne

[11] 3,869,661

[45] Mar. 4, 1975

[54] STIMULATING DEVICE HAVING A CONTROLLED POWER

[75] Inventor: Albert Rene Castaigne, Toulouse, France

[73] Assignee: Centre D'Etudes Pour L'Industrie Pharmaceutique, Toulouse, France

[22] Filed: June 21, 1973

[21] Appl. No.: 372,292

[30] Foreign Application Priority Data

June 26, 1972 France .................. 72.23013

[52] U.S. Cl. .............. 323/20, 128/2.1 R, 324/111, 324/141

[51] Int. Cl. .................. G05f 1/50

[58] Field of Search ........ 128/2.1 R, 419 D; 323/16, 323/19, 20; 324/103 P, 111, 140 R, 141, 142

[56] References Cited

UNITED STATES PATENTS

| | | | |
|---|---|---|---|
| 3,487,291 | 12/1969 | Dowghallo | 323/20 X |
| 3,498,288 | 3/1970 | Max et al. | 128/2.1 R |
| 3,582,942 | 6/1971 | Carter et al. | 324/111 X |
| 3,679,880 | 7/1972 | Carver | 324/111 X |
| 3,747,605 | 7/1973 | Cook | 324/142 X |
| 3,761,185 | 9/1973 | Blackwell | 324/103 P |

*Primary Examiner*—A. D. Pellinen
*Attorney, Agent, or Firm*—Young & Thompson

[57] ABSTRACT

Permits applying to a variable load, such as a living body, electric signals of defined power. It comprises a generator of a reference pulse, an analogue multiplier adapted to multiply the voltage of the signal applied to the variable load by the current passing therethrough, a loop for regulating the stimulation signal around the value of the reference signal transmitted by the generator, the loop being connected to the outputs of the multiplier and generator through a comparator, and further includes an integrator of the output signal of the multiplier and an apparatus for reading the energy output signal of the integrator.

3 Claims, 2 Drawing Figures

STIMULATING DEVICE HAVING A CONTROLLED POWER

Figure 1:
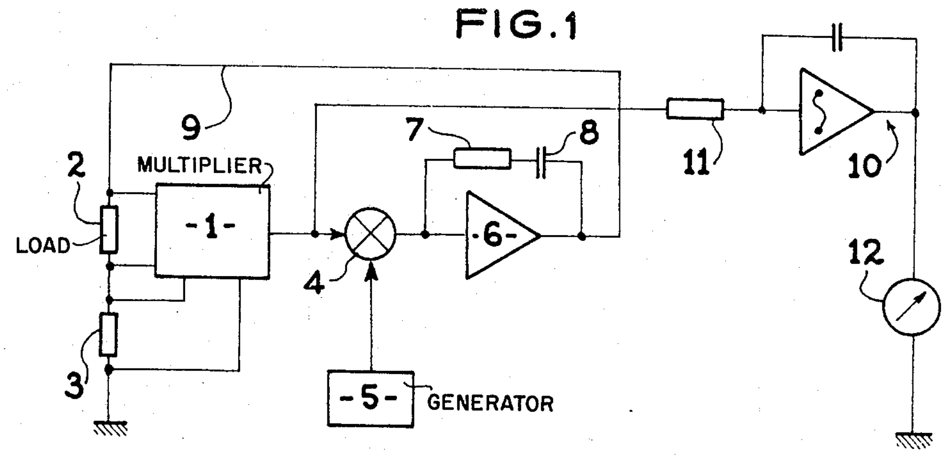

The present invention relates to the stimulation of living beings by means of electric signals of defined power so as to study their reaction to the signals.

An object of the invention is to provide such a stimulating device which comprises a generator of a reference pulse, an analogue multiplier adapted to multiply the voltage of the signal applied to the variable load by the current passing therethrough, a loop for regulating the stimulation signal around the value of the reference signal transmitted by the generator, said loop being connected to the outputs of the multiplier and generator through a comparator, an integrator of the output signal of the multiplier and an apparatus for reading the energy output signal of the integrator.

Further features and advantages of the invention will be apparent from the ensuing description with reference to the accompanying drawing.

Figure 2:
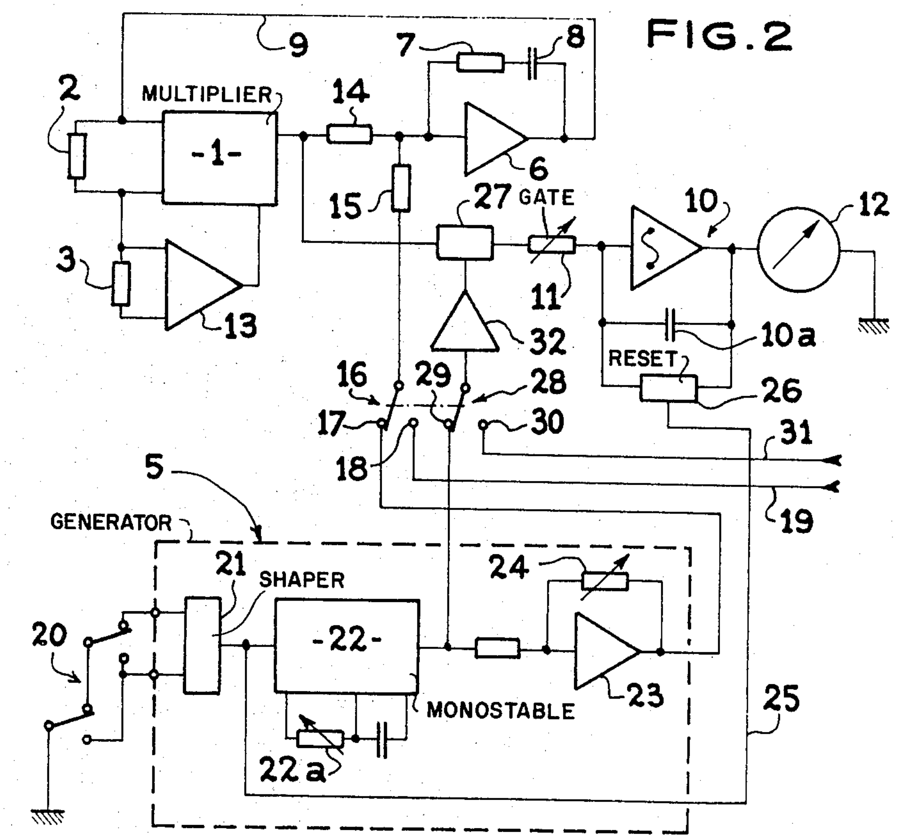

In the drawing :

FIG. 1 is a block diagram of the stimulating device according to the invention, and FIG. 2 is a more detailed circuit diagram of the device shown in FIG. 1.

The device shown in FIG. 1 comprises mainly a multiplier 1 to the input voltage terminals of which is connected a variable load 2 constituted by the test animal. Connected between the variable load 2 and earth, is a resistor 3 connected to the intensity input terminals of the multiplier 1. The output of the multiplier is connected to a first input of a comparator 4 whose second input is connected to a generator 5 of reference pulses. The output of the comparator 4 is connected to the input of an amplifier 6 whose feedback circuit comprises a resistor 7 and a capacitor 8 connected in series. The output of the amplifier 6 is connected by a conductor 9 to the variable load terminal 2 opposed to the terminal to which the resistor 3 is connected. The output of the multiplier 1 is connected to the input of an integrator 10 through a resistor 11. The output of the integrator 10 is connected to an apparatus 12 for measuring the energy integrated by the integrator.

According to the more detailed diagram of the device according to the invention shown in FIG. 2, the multiplier 1 is connected through a current amplifier 13 to the resistor 3 taking off the stimulation current from the variable load 2.

The comparator 4 comprises two resistors 14 and 15, the resistor 14 being connected to the output of the multiplier 1 whereas the resistor 15 is connected to the reference pulse generator 5 through the moving contact of a switch 16 whose fixed contact 17 is connected to the reference pulse generator 5 and whose other fixed contact 18 is connected to a control line 19 exterior to the device.

The reference pulse generator 5 comprises a control switch 20 having a push-button and connected to the input terminals of a shaping circuit 21 adapted to correct the irregularities of the signals produced by the control switch 20 due to the rebounds of the contacts of this switch.

The shaping circuit 21 employed is advantageously a logic circuit SM 7400 manufactured and sold by the firm TEXAS INSTRUMENTS, two gates of which are employed coupled as a flipflop so to obtain at its output a signal of rectangular shape.

The output of the shaping circuit 21 is connected to the input of a monostable circuit 22, for example of the type SM 74121 also sold by the firm TEXAS INSTRUMENTS and whose output is connected to the input of a power amplifier 23 which is adjustable by means of a variable resistor 24.

The monostable circuit 22 is adjustable by means of a variable resistor 22a.

Connected between the output of the monostable circuit 22 and the input of the power amplifier 23 is an amplitude calibrating circuit controlled by the output signal of the monostable circuit 22.

The output of the power amplifier 23 is connected to the fixed contact 17 of the switch 16. The output of the shaping circuit 21 is also connected through a conductor 25 to the input of a zero-setting circuit 26 for the integrator 10. The multiplier 1 is connected to the input of the integrator 10 through a gate 27 and a variable resistor 11.

One input of the gate 27 is connected to the moving contact of a switch 28, whose fixed contact 29 is connected to the output of the monostable circuit 22 of the generator 5 whereas its other fixed contact 30 is connected to a conductor 31 controlling duration exterior to the device. Inserted between the moving contact of the switch 28 and the gate 27 is an amplifier 32.

The junction point common to the resistors 14, 15 of the comparator is connected to the input of the amplifier 6 which constitutes an error amplifier. The output of the latter is connected through the line 9 to the input of the multiplier 1 opposed to the point of connection of the current amplifier 13.

The analogue multiplier 1 employed is advantageously of the type BURR-BROWN 409825.

The device also comprises a number of switches and potentiometers (not shown) whereby it is possible to adjust the zeros of the amplifiers and also protections against overvoltages placed at the input of the multiplier 1 and at the exterior inputs 19 and 31.

The device just described operates in the following manner:

With the variable load 2 connected to the terminals of the multiplier 1, there is applied thereto a pulse after having placed the moving contact of the switch 16 on its fixed contact 17 and the moving contact of the switch 28 on its fixed contact 29.

The initial stimulating pulse is obtained by the closure of the switch 20 by depressing its push-button. The pulse thus generated is shaped by the circuit 21 and applied to the monostable circuit 22 and also through the line 25 to the zero-setting circuit 26 of the integrator 10.

The output of the monostable circuit 22 which was initially in the 1 state passes to 0 state and the pulse resulting therefrom is applied to the amplifier 23 then transmitted through the switch 16, the resistor 15, the amplifier 6, and the line 9, to the load 2.

At the terminals of the latter appears a difference of potential which is applied to the multiplier 1 whereas the current through the load 2 is taken off at the resistor 3 and applied in the form of a voltage to the multiplier 1 through the operational amplifier 13.

The output signal of the multiplier 1 represents the power applied to the variable load 2, since it corresponds to the product of the voltage applied to the load 2 by the current therein.

As the amplitude of this signal represents the power, this amplitude which was integrated during the duration of the pulse, represents the energy produced. According as the load 2 has self or capacitive characteristics, the shape of the signal received at this terminal is different.

The output signal of the multiplier 1 is compared with the reference signal produced by the generator 5 at the point of junction of the resistors 14 and 15. If the signals are equal there is no signal at the input of the amplifier 6. On the other hand, if the output signal of the multiplier 1 is different from the reference signal, the difference is amplified by the amplifier 6 and — which corrects the voltage — applied to the variable load 2.

Thus the stimulation signal is regulated around the value of the reference signal produced by the generator 5.

The integration of the output signal of the multiplier 1 is ensured by the integrator 10 which delivers a continuous current level which is easily read on the galvanometer 12 which is graduated in terms of energy, for example in millijoules or microjoules.

In order to ensure that the signal applied to the integrator 10 is in fact the signal produced by the multiplier 1, the input of the integrator 10 is only connected to the output of the multiplier at the moment of measurement, that is, when a signal is produced by the generator 5. This is achieved by the gate 27 an input of which is connected for this purpose to the output of the monostable circuit 22 through the switch 28 and the amplifier 32.

In order to have a large voltage excursion, the gate 27 is a gate having field effect semiconductors whereas the amplifier 32 is a threshold detector amplifier.

If the device according to the invention is desired to be employed with an exterior source of stimulation, the switches 16 and 28 are respectively placed on their contacts 18 and 30. The conductor 19 then receives pulses of stimulation whereas square signals are applied to the conductor 31 through a generator (not shown). The rest of the circuit operates in the same manner as before.

The integrator 10 is constituted, for example, by an integrated amplifier of the type SFC 2741E manufactured and sold by the firm COSEM.

The input impedance of this amplifier is rendered high by the addition of two field effect transistors (not shown).

This high input impedance is required to retain the information in memory and permit an easy reading of the measurements on the galvanometer 12.

The zero-setting of the integrator 10 is ensured by the circuit 26 before application of each stimulation pulse. The circuit 26, controlled by the signal produced by the circuit 21, short-circuits a capacitor 10a associated with the amplifier of the integrator 10.

Having now described my invention what I claim as new and desire to secure by Letters Patent is:

1. A device for applying to a variable load, in particular to living beings, electric signals of defined power, comprising an analogue multiplier having input voltage terminals adapted to be connected to the load to multiply the voltage difference across said terminals to produce an output signal, a reference pulse generator producing a reference signal, a comparator for receiving and comparing said signals and for producing an error signal in response to any difference in said output and reference signals, means for applying said error signal to said load, an integrator of the output signal of the multiplier, and means for reading the energy output signal of the integrator, said generator comprising a switch having a pushbutton, a shaping circuit, a monostable circuit, and an amplifier, an output of the shaping circuit being connected to an input of the monostable circuit and the monostable circuit having an output connected to the input of the amplifier.

2. A device for applying to a variable load, in particular to living beings, electric signals of defined power, comprising an analogue multiplier having input voltage terminals adapted to be connected to the load to multiply the voltage difference across said terminals to produce an output signal, a reference pulse generator producing a reference signal, a comparator for receiving and comparing said signals and for producing an error signal in response to any difference in said output and reference signals, means for applying said error signal to said load, an integrator of the output signal of the multiplier, and means for reading the energy output signal of the integrator, the output of the multiplier being connected to the input of the integrator through a gate, said generator including a monostable circuit, said gate having an input which is connected to the output of said monostable circuit through a threshold amplifier.

3. A device as claimed in claim 2, and input lines for stimulation of the variable load by exterior devices, said lines being respectively connected to the comparator and to the threshold amplifier through switches.

* * * * *